June 13, 1972   C. R. BRADSHAW ET AL   3,669,765
PROCESS FOR COATING METAL FLAKES
Filed May 12, 1969   3 Sheets-Sheet 1

INVENTORS
CARLETON R. BRADSHAW
BY HAL CURTIS FELSHER
Kenyon & Kenyon
ATTORNEYS

June 13, 1972  C. R. BRADSHAW ET AL  3,669,765
PROCESS FOR COATING METAL FLAKES
Filed May 12, 1969  3 Sheets-Sheet 2
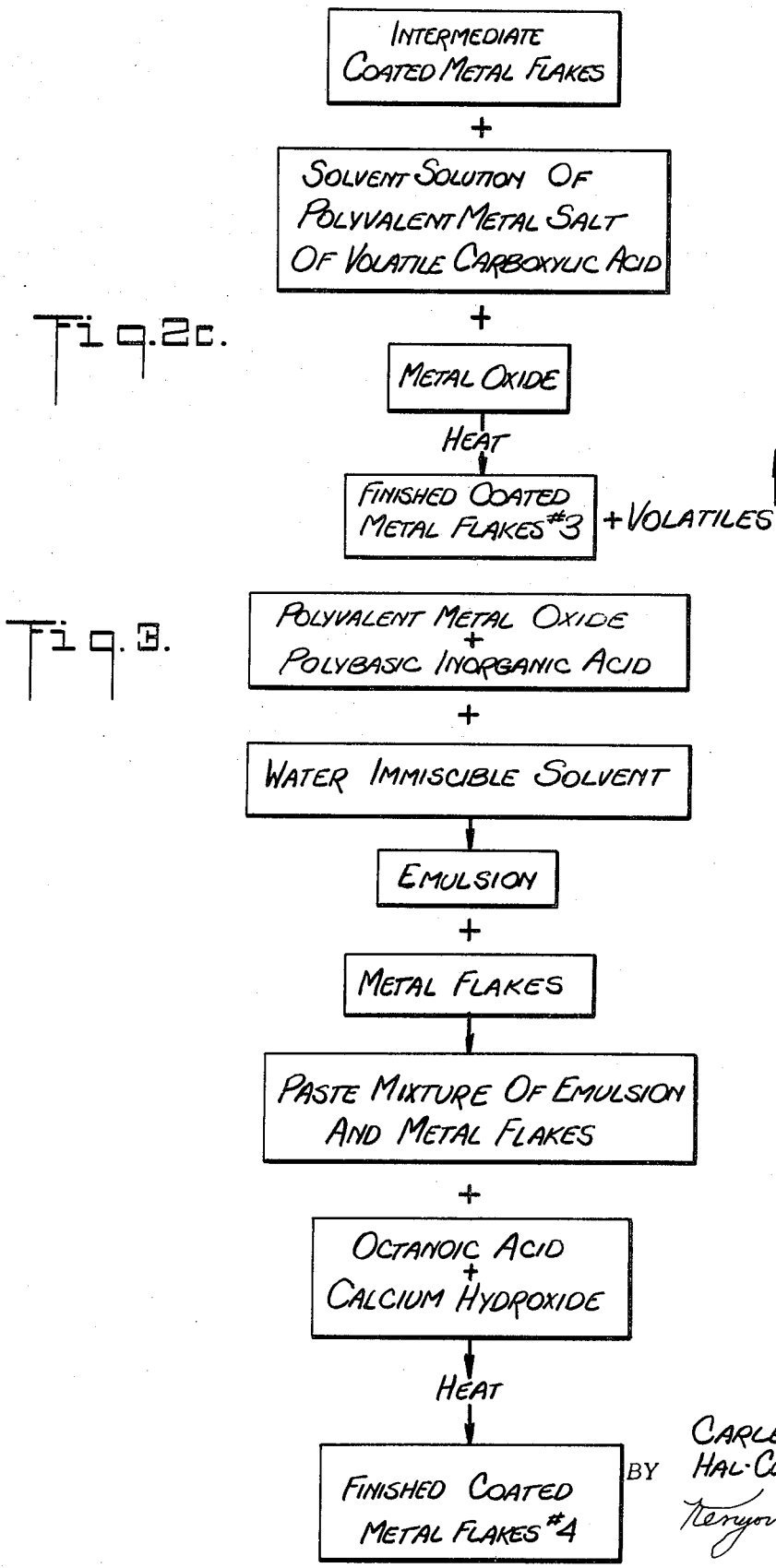

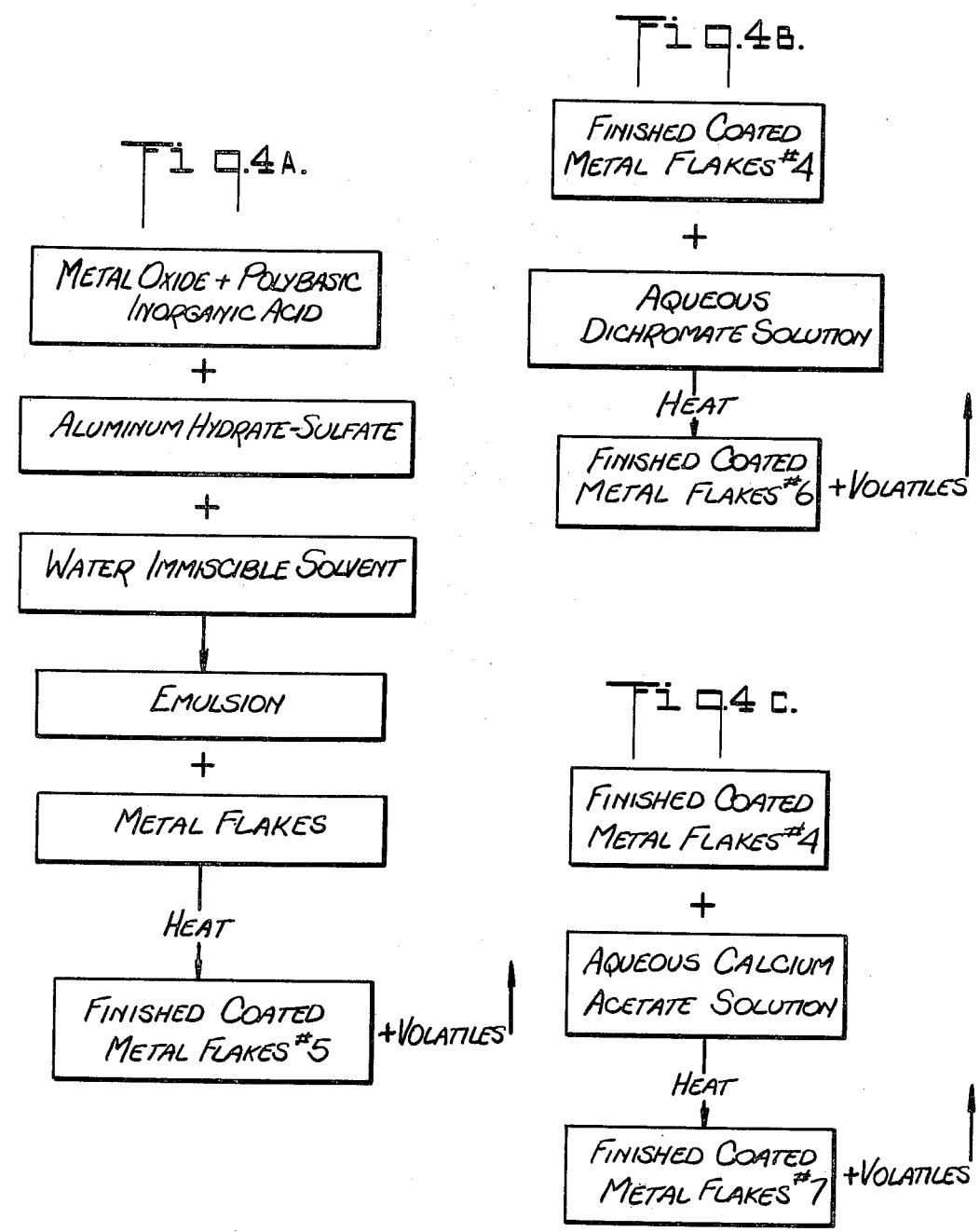

3,669,765
Patented June 13, 1972

1

3,669,765
PROCESS FOR COATING METAL FLAKES
Carleton R. Bradshaw, 681 Lowell Ave., Central Islip, N.Y. 11722, and Hal-Curtis Felsher, 114 Bounty Lane, Jericho, N.Y. 11753
Continuation-in-part of application Ser. No. 633,341, Mar. 29, 1967, which is a continuation-in-part of application Ser. No. 532,493, Jan. 25, 1966, which in turn is a continuation-in-part of application Ser. No. 133,324, Aug. 23, 1961. This application May 12, 1969, Ser. No. 832,543
Int. Cl. C23f 7/08
U.S. Cl. 148—6.16                                                6 Claims

ABSTRACT OF THE DISCLOSURE

Metal flakes, particularly flakes of copper or copper alloys, are admixed with water-in-oil emulsions wherein the aqueous phase is a solution of a polyvalent metal acid phosphate salt such as zinc and/or aluminum acid phosphate, and the emulsion is evaporated off to provide the flakes with an oxidation resistant metal acid phosphate coating. On treatment of the coated flakes, either in the original admixture or after separation from the emulsion, with a polyvalent metal compound, such as calcium oxide, there is produced an oxidation- and water-resistant coating. The resulting product may be treated with additional stabilizing materials, such as vinyl stabilizers or chelating agents.

DESCRIPTION OF THE INVENTION

This application is a continuation-in-part of our copending application, Ser. No. 633,341, filed Mar. 29, 1967 now abandoned, which was a continuation-in-part of our copending application, Ser. No. 532,493, filed Jan. 25, 1966, now abandoned, which in turn was a continuation-in-part of our copending application, Ser. No. 133,324, filed Aug. 23, 1961, now abandoned.

This invention relates to a coating process which is suitable for use in forming a protective coating on metal flakes, particularly those composed of alloys of copper and/or zinc. Specifically, this invention relates to a method for producing an inorganic coating and also relates to the coatings thus produced.

Plastic materials of polyvinyl chloride or like substances are manufactured with fillers or flakes in order to obtain a certain aesthetic or utilitarian effect. One of the main disadvantages in the use of metal fillers or flakes is that under processing conditions involving elevated temperatures corrosive substances are produced which react with the metals causing adverse consequences. For example, in some instances, the corrosive compounds which are liberated react with the metals to produce colored products, and these in turn may cause degradation of the plastic sheet or sticking of the same to calendering rolls during processing. The adverse effects are particularly pronounced in the case of bronze, brass or "gold" fillers which contain copper with or without zinc. It has only been through judicious choice of filler particle sizes and temperature and time of calendering that pigment-containing plastic products have been obtained which can be sold commercially, but even in this case, the product is not entirely satisfactory. In limiting the surface area of the filler, the particle size must be increased to a point at which the aesthetic effect is diminished. Besides, even careful processing attacks the metal flake to the point of seriously impairing its initial brilliance; this attack further aggravates the inherently poor resistance of the flake to tarnishing under the influence of light, heat, moisture, oxygen and sulfide, among other agents.

Accordingly, it is an object of this invention to provide a method for coating metal particles or flakes in order to protect them from corrosive substances which would otherwise attack the surface thereof.

Another object of the present invention is to provide a plastic sheeting material containing metal particles or flakes formed of copper and/or zinc alloys, wherein the metal particles are substantially unaffected by their incorporation in the plastic material and subsequent aging therein.

Briefly stated, the present invention involves a method of coating metal particles with an inorganic material. Providing the particles with a coating of this invention imparts a protective shield which substantially eliminates the degradation of both the particles and the plastic material in which the particles are incorporated. Accordingly, the method of the present invention has made possible the use of decorative metal flakes of brass, copper and the like in plastic materials containing chlorinated or acidic polymers. Previous to the invention, the heat of melting and forming the plastic liberated corrosive materials which reacted with the metal flakes and thus impaired their appearance and properties to the point of making the plastic commercially unfit.

This invention is suited to the treatment of particulate metal of any type which may be treated in aqueous media. Because the process of this invention is conducted in aqueous media, it is understood that metals such as the alkali metals which react with and form water soluble reaction products cannot be coated thereby. Moreover, although noble metals such as gold and silver can be coated in accordance with this process, there is ordinarily no reason to do so since they do not require a protective coating. The present process is of particular applicability for treating flake metallic pigments, such as aluminum, iron, nickel, copper and alloys thereof, and especially copper base alloys, such as copper-zinc, copper-tin, copper-zinc-tin and copper-zinc-aluminum in particulate form. The particles may range in size from about 10 mesh to about 400 mesh or even finer. Flakes, i.e., particles which are substantially smaller in one dimension than in the other two, are particularly suitable for incorporation in plastic material as aforementioned and are readily coated according to the present invention.

According to this invention metal particles or flakes are agitated in a water-in-oil emulsion in which the aqueous phase is an aqueous solution of a polyvalent metal acid phosphate salt. Agitation of the metal particles in an emulsion of this type followed by separation from the emulsion and drying, results in having an acid phosphate salt coating which is oxidation resistant but susceptible to water. This water susceptible coating may be converted into a water resistant coating comprising a phosphate glass by reaction of the hydrogen ions therein according to various embodiments of the invention which will be described subsequently. Finally, according to all embodiments of this invention, the emulsion is evaporated, leaving dry metal particles having an adherent inorganic coating which is both water resistant and oxidation resistant on the surfaces thereof.

This invention will be described in greater detail with respect to the accompanying drawings in which:

FIGS. 2A, 2B and 2C are schematic flow sheets of alternative embodiments of the second part of a process for coating metal flakes according to this invention, illustrating the transformation of the coating obtained in FIG. 1 into a water resistant coating;

FIG. 3 is a schematic flow sheet of a process for producing oxidation resistant and water resistant coatings on metal flakes in a single operation combining the processes of FIGS. 1, 2A, 2B and 2C;

FIG. 4A is a schematic flow sheet of an alternative embodiment of a method of coating metal flakes in accordance with the present invention;

FIGS. 4B and 4C are schematic flow sheets of alternative processes for further treating the coated metal flakes of FIG. 4A.

Figure 1:
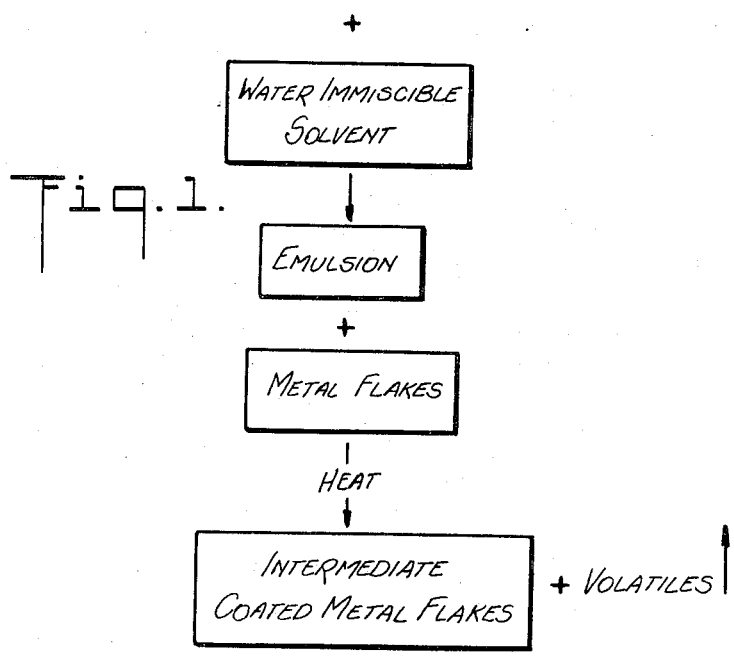
FIG. 1 is a schematic flow sheet of the first part of a process for coating metal flakes in accordance with this invention, illustrating the formation of an oxidation resistant but water susceptible coating.

In accordance with one embodiment of this invention, illustrated in FIG. 1, the metal particles are contacted with a water-in-oil emulsion in which the aqueous phase is an aqueous polyvalent metal acid phosphate salt solution. After agitation of the particles in the emulsion, the emulsion is removed, preferably by evaporation, and coated metal particles having an acid phosphate salt coating which is oxidation resistant but water susceptible are recovered.

The metal ion of the acid phosphate salt can be an ion of any polyvalent metal which forms a water soluble acid phosphate and a water insoluble phosphate glass. Thus, practically any metal ion may be employed, other than the alkali metals and barium. Even barium ions may be present in the aqueous phase provided other polyvalent ions are also present and the barium ion constitutes a minor amount, e.g., less than about 10 percent by weight, of the combined metal ions. More than one metal ion may be present if desired. Illustrative polyvalent metals include aluminum, calcium, cobalt, chromium, lead and zinc. Aluminum and zinc are preferred, with aluminum being particularly preferred.

The acid phosphate solution may be formed in any suitable manner. A preferred technique comprises dissolving a polyvalent metal oxide or hydroxide in concentrated, e.g., 85%, phosphoric acid. The ratio of metal oxide to phosphoric acid is desirably such that there is no free $HP_3O_4$ present in the solution, but not high enough for complete neutralization of the phosphoric acid.

More particularly, in adding the metal oxide to the poly-basic acid, it is necessary to add an amount sufficient to decrease the acidity in order to prevent acid etching of the flake surface. However, it is essential to retain the solution moderately acidic so that it will have a pickling effect on the metal plates thereby cleaning them and preparing the surface for coating. Therefore, an excess of oxide is to be avoided. It has been found that a ratio of .1 to .4 equivalent of oxide to 1.0 equivalent of acid achieves the above desired conditions. Preferably the ratio should be .25 to .30 equivalent of oxide to 1.0 equivalent of acid.

The concentration of polyvalent acid phosphate salt is not narrowly critical, provided that a complete solution is obtained which is not so viscous that the solution cannot be easily evenly distributed over all of the metal particles. When produced by adding a metal oxide or hydroxide to aqueous phosphoric acid, as described above, and employing the common commercial form of 85 percent $H_3PO_4$ in aqueous solution. A suitable solution is obtained by adding the oxide or hydroxide to the 85 percent phosphoric acid which has been diluted with about an equal weight or less of water, preferably from about 0.85 to about 0.9 part of water percent of 85 percent phosphoric acid. Higher ratios of water to phosphoric acid tend to result in a precipitation of at least a part of the acid phosphate, whereas lower ratios generally result in such viscous solutions that an even coating is difficult to achieve.

The metal acid phosphate solution thus formed is emulsified using a water-immiscible hydrocarbon solvent and a suitable surface active material. The emulsion is formed in accordance with well known practice so that the aqueous phase is in the form of droplets dispersed in the hydrocarbon solvent. The aliphatic hydrocarbon solvent boiling range of 200° to 232° F. has been found particularly suitable, but it will be understood that both aliphatic and aromatic hydrocarbons having higher or lower boiling points or ranges may be used. The surface active agent is preferably a non-ionic surface active agent. Exemplary of such a surface active material is the class of compounds in which polyethylene glycols of from 4 to 8 ethylene glycol units are attached to an alkylated benzene group.

It is necessary that the emulsion be formed so that the aqueous phase is present as droplets surrounded by a continuous phase of the water-immisicible liquid. The method of forming such an emulsion is well known in the art and needs no detailed explanation at this point.

The metal particles or flakes which are to be coated are then contacted with the emulsion produced as described above and are agitated. In this manner each particle is effectively coated with a thin layer of an aqueous metal acid phosphate solution.

The concept of using an emulsion to coat the flakes or metal particles in accordance with this invention plays an important part in the success of the process. First, the use of an emulsion prevents excessive concentrations of acid at the surface of any particular particle. This is important in order to minimize or eliminate degradation due to acid attack. Another important advantage gained by the use of an emulsion is that uniformity of distribution is assured since the emulsion will absorb by re-emulsification an excess of the aqueous phase should there be too much in any droplet for the particular particle with which it associates. In other words, a steady state is attained very rapidly wherein each particle is covered by substantially the same amount of aqueous solution per unit surface area. The excess aqueous phase, if any, is maintained in emulsion at the same time. Thus, the use of such a system tends to prevent agglomeration between the particles during the step of removing the aqueous materials from the mixture. In addition, the aqueous solution is quite viscous, and its application in the form of a water-in-oil emulsion assures uniformly coating all particles.

The agitation of the metal flakes in the emulsion may be carried out in any suitable apparatus. A rotary vacuum dryer which permits tumbling of the metal flakes is well suited to carrying out this invention, because the flakes may then be dried and the emulsion removed without the necessity of transferring the mixture of emulsion and flakes from one vessel to another.

After agitation of the metal flakes in the emulsion, the liquid is then removed from the metal particles in any suitable manner, heating in a vacuum dryer being one preferred method. At the end of this drying step, during which the particles are preferably tumbled in order to prevent their adhering one to another, the surface of the metal particles are coated with a thin layer of metal acid phosphate.

It should be noted that the process as described above involves a mechanism quite different from that of conventional phosphatizing techniques. In the conventional processes, an essential element is a reaction of the metal being treated with the phosphatizing solution to form a water-insoluble precipitate on the metal surface. Because of the impermeability of the resulting coating, thus preventing reaction of substrate with the phosphate solution, the thickness of the film is limited. In the process of this invention, however, although such a reaction may occur to a limited extent, the coating is essentially the acid phosphate salt which, by virtue of its viscous nature, readily adheres to the metal particles. As a result, a substantially thicker and thus more durable coating is obtained.

The acid phosphate coating in this form is oxidation resistant but is subject to attack by water or water vapor. While such a coating is satisfactory where water resistance is not required, it is necessary for most purposes to convert this coating into a phosphate glass coating which is both oxidation resistant and water resistant. This is accomplished by treating the coated metal particles with a polyvalent metal compound which will replace the hydrogen ions of the coating with the metal of the compound and thereby produce a phosphate glass coating which is resistant to water as well as to air. The polyvalent metal may be any metal which will react with the metal acid phosphate coating to provide an insoluble phosphate glass, and is of the same class as that used in forming the metal acid phosphate salt. The metal need not be the same metal as that forming the acid phosphate salt. For example, when the preferred aluminum acid phosphate is employed, the metal used for the insolubilization treatment is preferably calcium. The particular metal compound employed is not highly critical, provided the metal can react with the acid phosphate to form a phosphate glass. Preferred compounds are carboxylic acid salts, and inorganic oxides and hydroxides. The insolubilization may be accomplished by way of the embodiments of this invention illustrated by FIGS. 2A, 2B and 2C.

Figure 2A:
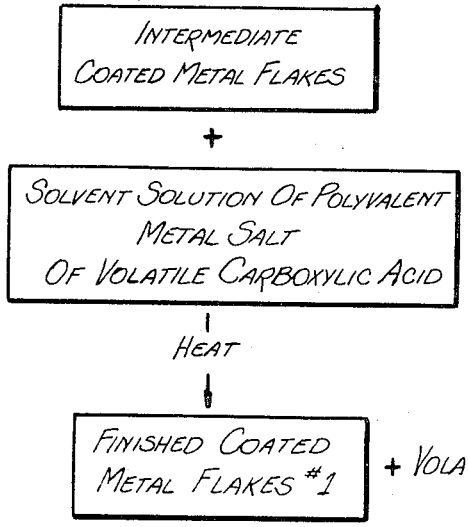

The process illustrated by FIG. 2A involves treating the coated metal particles with a solution of a polyvalent metal salt of a carboxylic acid. The carboxylic acid should be a volatile compound, to facilitate its recovery as will be hereinafter described, but may be either water soluble or water-immiscible. Zinc is a preferred polyvalent metal in this embodiment. Suitable polyvalent metal salts include zinc octoate, zinc acetate, and cobalt naphthenate. This salt is preferably dissolved in a suitable volatile solvent. The solvent may be water where the anion of the salt is a hydrophilic anion such as acetate, but is preferably a hydrocarbon solvent where the anion of the salt is derived from a water-immiscible carboxylic acid such as octanoic acid or naphthenic acid. An acid interchange reaction occurs in which the metal replaces the hydrogen ions in the coating and the replaced hydrogen ions combine with the carboxylic acid group. In this acid interchange reaction, free carboxylic acid is formed in the solution.

After suitable mixing, the treated particles are dried to remove the solvent and carboxylic acid. This is preferably accomplished by heating in a vacuum dryer, volatilizing both the solvent and the carboxylic acid. In this manner a complex inorganic coating is formed on the surface of the particle. Such coating is unaffected by such treatment as boiling in water, and is also resistant to solution by most of the common solvents.

Figure 2B:
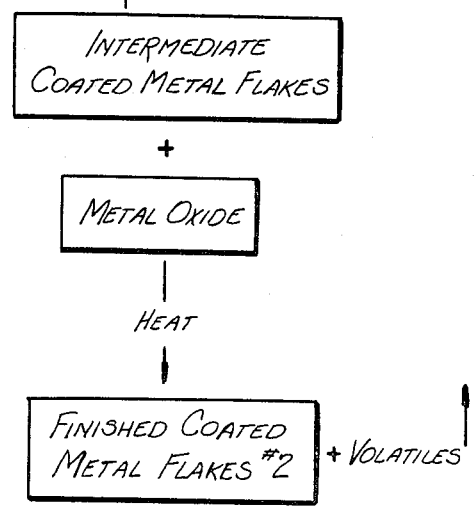

A second alternative for the formation of the phosphate glass, as illustrated by FIG. 2B, involves treating the acid phosphate salt coated particles with a finely divided metal oxide or hydroxide, such as calcium hydroxide. In this manner, the free hydrogen ions present in the initial coating are replaced by the metal, and water is formed which can be removed by drying in a suitable manner.

It has been found desirable to combine the above two alternative steps into a single second step, illustrated in FIG. 2C. Thus, a combination of metal carboxylic acid salt and metal oxide or hydroxide may be added to the coated metal flakes coated with an oxidation resistant but water susceptible coating as described in FIG. 1. This alternative procedure produces a coating which has better properties than that produced by either of the two steps illustrated in FIGS. 2A and 2B, respectively, used alone. The metal carboxylic acid salt used in the process of FIG. 2C may be the same as the metal salts of carboxylic acids used in the process described with reference to FIG. 2A. The metal hydroxides and oxides used in the process of FIG. 2C may be the same as those used in FIG. 2B, such as calcium hydroxide, for example.

Instead of mixing the intermediate coated metal flakes from the process of FIG. 1 with a metal oxide or hydroxide and a polyvalent metal salt or a carboxylic acid, it is possible to mix the metal flakes with a combination of metal oxide or hydroxide and free carboxylic acid. The metal oxide or hydroxide is preferably present in excess of the stoichiometric amount required for neutralization of the free carboxylic acid to form the corresponding metal salt. The metal oxide or hydroxide reacts with the carboxylic acid to form the metal salt thereof in situ. In each embodiment, it is desirable that the polyvalent metal compound be in intimate contact with the acid phosphate salt coating. Thus, the compound should be applied in the form of a finely divided solid, preferably in suspension in an inert liquid medium or as a solution. This suspension or solution is then thoroughly mixed with the pretreated metal particles to enable reaction of the polyvalent metal compound with the acid phosphate salt coating and form an insoluble phosphate glass coating.

Illustrative of the use of the combined steps illustrated in FIGS. 1 and 2C is Example I set forth below:

Example I 25 parts by weight of zinc oxide were mixed with 90 parts by weight of 85% phosphoric acid and 80 parts by weight of water. The ingredients were mixed until a clear solution was obtained.

50 parts of the above solution were added to a steam-jacketed double cone vacuum drier along with 800 parts of an aliphatic hydrocarbon solvent, B.P. 200° F.–232° F., marketed under the trade name Lactol Spirits by American Mineral Spirits Company, 400 parts of metal flake, and 8 parts of surface-active material, all by weight. The flake was composed substantially of an alloy of 70% copper and 30% zinc, by weight, and was sized so that virtually all was smaller than 80 mesh and larger than 100 mesh. The surface-active material employed was an aryl-alkyl polyether alcohol marketed under the trade name Triton X–114 by Rohm & Haas. The vacuum dryer was then rotated for approximately 15 minutes. Heat and vacuum were then applied until the temperature of the dryer attained 155° F. This step was continued until all of the volatile materials were removed. The resulting flakes were dry and free flowing and all surfaces were coated with a zinc acid phosphate salt.

For the second step, a mixture was prepared containing 160 parts of ethanol, 18 parts of a solution of zinc octoate dissolved in mineral spirits (90% by weight of zinc octoate), 16 parts of calcium hydroxide powder (2–6 micron size range), and 8 parts of calcium stearate, all by weight. The calcium stearate was added to serve as a lubricant to prevent adhesion of the flakes to each other and to the walls of the dryer.

This mixture was added to the dry flakes which were still present in the dryer after the first step. The dryer was rotated for approximately 15 minutes to mix the ingredients. Heat and vacuum were applied until a temperature of approximately 180° F. was attained. The drying step was continued until all of the liquid has been removed. This was a period of approximately 60 minutes.

To test the advantages of the coating as prepared in this example, coated particles and raw, uncoated particles were tested as follows. First, both the coated and the uncoated flakes were heated for 1 hour at 350° F. in air. A sample was removed from both the coated and uncoated flakes, and the balance of the flakes were heated for an additional 26 hours in the same environment.

The raw, uncoated flake was severaly dulled by the 1 hour treatment at 350° F., whereas the coated flake was not visibly changed from its original condition prior to heating.

After the 27 hours treatment, the coated flake was still visibly unchanged, whereas the uncoated flake had been very severely tarnished and degraded.

As a second comparative test, both coated and uncoated flakes were immersed in boiling water for a period of 1 hour. The flakes were dried and then subjected to the heating test set forth above.

After 1 hour at 350° F., the coated flakes were visibly unchanged whereas the uncoated flakes tarnished as before. The 27-hour test gave the same results, namely, that the coated flake was visibly unchanged as a result of the boiling followed by heating, whereas the uncoated flake was again severely degraded.

It was also determined that the coating was not affected by solvents including methyl ethyl ketone, toluol, and tetrahydrofurane.

In the example described above, calcium stearate was added in the second step. As stated in the example, the calcium stearate served as a lubricant to prevent adhesion of the flakes to each other and to the walls of the drier. It has ben found desirable during this second step to add such a non-volatile lubricating agent, and other materials besides calcium stearate may be used for this purpose.

After the first step of the process described in the above example, the flakes are coated with a material whose only serious drawback is its susceptibility to water or water vapor. Thus, for example, the heating tests described in the above example were conducted on flakes which were coated only by the first step of the process. Flakes so coated withstood the heating test equally as well as those flakes which had the benefit of the second step of the coating process. However, in those tests in which boiling in water preceded the heating test, flakes having only the first step coating did not favorably compare with those having a coating formed in the two-step process. However, it is to be appreciated that for those uses which do not require water resistance, flake coated in accordance with the first step of the above process is suitable.

According to a further embodiment of this invention, illustrated in FIG. 3, metal flakes are coated with an oxidation resistant and water resistant inorganic coating in a single operation involving only one drying step. A water-in-oil emulsion in which the aqueous phase consists of a metal acid phosphate salt solution is prepared as described above in connection with FIG 1. The metal flakes to be coated are mixed with this emulsion and the mixture agitated as described with reference to FIG. 1. However, instead of volatilizing the emulsion to form an acidic, oxidation resistant but water susceptible coating on the surfaces of the metal flakes, a polyvalent metal oxide, hydroxide or salt is added to the emulsion. The polyvalent metal compound may be either an oxide or hydroxide such as calcium oxide or calcium hydroxide respectively. Alternatively, a salt of a polyvalent metal and water insoluble carboxylic acid, for example, calcium octoate, or zinc octoate may be added to the emulsion. If desired, both a polyvalent metal salt and a polyvalent hydroxide or oxide as described herein, as for example, zinc octoate and calcium hydroxide, may be added to the emulsion. The emulsion is then further agitated, as for example, by tumbling. The amount of polyvalent metal compound or compounds added is sufficient to neutralize the acid contained in the emulsion. The volatile components of the emulsion are then removed from the metal flakes by any suitable means such as evaporation. Heating of the metal flakes during evaporation forms a water resistant and oxidation resistant inorganic coating, as for example, a coating of zinc phosphate or a mixture of calcium and zinc phosphates, on the metal surfaces.

The production of a water resistant and oxidation resistant coating in a single operation requiring only one drying step may be illustrated in Example II below.

Example II

An acidic phosphate solution was prepared by dissolving 25 parts by weight of zinc oxide and 13 parts by weight of aluminum sulfate hydrate in 90 parts by weight of 85% phosphoric acid and 80 parts by weight of water. An emulsion was formed by mixing 35 parts of this phosphate solution with 90 parts by weight of lactol spirits and 5 parts by weight of an alkyl aryl polyether alcohol ("Triton X-114"). To this emulsion was added 250 parts by weight of brass flakes composed of an alloy of 70% copper and 30% zinc by weight, and having a particle size of 300 mesh. The metal flakes were mixed with the emulsion at room temperature to form a paste. To this paste was added an additional 100 parts by weight of lactol spirits over a period of 45 minutes. The final mixture had the consistency of a soft paste. To this paste were added 3.75 parts by weight of octanoic acid and 15 parts by weight of calcium hydroxide in the order named and over periods of 10 minutes to 30 minutes respectively. Heat and vacuum were then applied while the blades of the mixer were rotated, until all volatiles were removed. The coated metal flakes were then removed from the mixer.

Still another embodiment of the present invention, illustrated in FIG. 4A, involves a coating process in which an impervious inorganic coating may be applied to the metal flakes in a single step. In this embodiment the metal acid salt is prepared in the manner described above. To the aqueous solution of the metal acid salt is added aluminum hydrate-sulfate. The hydrate-sulfate is used on account of its solubility advantage over aluminum hydroxide.

The flakes are then treated with this solution in the manner described above. A coating is thus imparted to the flakes which is substantially the equivalent of the coating provided in the two-step process heretofore described. Example III below illustrates this embodiment of the invention.

Example III

A zinc acid phosphate solution was prepared as described in Example I above.

50 parts by weight of the zinc acid phosphate solution were mixed with 12 parts by weight of an aluminum hydrate-sulfate which is marketed under the name "Alumina Hydrate Regular" by H. Kohnstamm & Co.

The 62 parts of the solution thus prepared were then mixed with 800 parts of Lactol Spirits, 400 parts of the metal flake as described in Example I, and 8 parts of Triton X-114, all parts by weight.

The mixture was added to a steam-jacketed double cone vacuum drier. The drier was rotated for approximately 15 minutes to effect mixing, and heat and vacuum were then applied to attain a temperature of 155° F. The drying step was continued until all of the liquid was removed. The resultant flakes were free flowing and coated with a non-crystalline inorganic material.

Flakes coated in accordance with Example III were subjected to the same series of tests as described in Example I above. In each instance, the flakes coated in accordance with Example III remained visibly unchanged, whereas the uncoated flakes suffered the same degradation as previously described.

Although flake produced in accordance with the method exemplified by Example III is excellently suited for use in plastic formulations, it has been found that an even more stable coating is obtained by treating such flake in a second step. Such second step involves treatment with a dichromate solution. This alternative is described in detail in Example IV below.

Example IV

The flakes were coated as described in Example III. A solution was prepared from 9.1 parts of potassium dichromate pentahydrate in 50 parts of water, by weight. The coated flake was then added to the dichromate solution in a proportion of 100 parts of coated flake to 90 parts of dichromate solution. The mixture was placed in a steam-jacket vacuum drier and heat and vacuum were applied until the liquid was completely removed. The flakes were then washed with water to remove any soluble dichromate, followed by drying.

Flakes coated in accordance with Example IV were subjected to the same series of tests as described in Example I above. In each instance, the flakes coated in accordance with Example IV remained visibly unchanged, whereas the uncoated flakes suffered the same degradation as previously described.

Although Example IV describes the use of potassium dichromate, other salts may be substituted therefor, particularly a carboxylic acid salt of a polyvalent metal as described with reference to FIG. 2A which is soluble in water to the extent of at least approximately 1% by weight. Preferably a solution of at least 5% by weight should be used to minimize the amount of liquid which must be handled. Additionally, an aqueous solution of the salt should exhibit a pH not substantially lower than about 5 in order to avoid excessive pickling of the surface of the flakes. Calcium acetate, for example, is a suitable substitute for potassium dichromate.

In the instance of coating very fine metal flakes (e.g., −400 mesh) in accordance with the processes of this invention, it is desirable to include a plurality of small porcelain balls when tumbling the flakes in order to prevent the flakes adhering one to another. It has been found that using 1-inch diameter balls does a satisfactory job in this respect.

The several embodiments described above all provide the same type of coating, that is to say, a flexible adherent inorganic coating which is insoluble in water and which is impervious to the various corrosive constituents normally found in plastics containing chlorinated or acidic polymers following shaping techniques such as hot calendering. As stated above, copper and/or zinc containing metal flakes or particles heretofore could not be utilized in such plastics because of the severe degradation both of the plastic material and of the metal flakes. By treating thhe metal particles or flakes in accordance with this invention to provide a coating thereon prior to incorporation in plastic materials, the absence of such degradation is assured.

To illustrate, when uncoated flake is incorporated into polyvinyl chloride plastic, the combination can be masticated on a roll mill for only a very few minutes. Longer times will cause severe degradation of the metal flake followed almost immediately by disintegration of the plastic mass with evolution of hydrogen chloride fumes. Even a sample of polyvinyl chloride containing uncoated flakes which has been milled for the minimum time will react very poorly when subjected to as little as twenty hours exposure to ultraviolet radiation in a Fade-Ometer. Under such conditions the flake becomes dulled and tarnished. Likewise, the flake is degraded by immersion in water for a period of twenty-four hours or exposure to sunlight and moisture for a period of three days.

In comparison, the milling temperatures and times for incorporation of flakes of this invention into polyvinyl chloride are limited only by the ability of the polyvinyl chloride to withstand degradation and not by color changes in the flake. Polyvinyl chloride containing coated flakes of this invention can withstand ultraviolet radiation in excess of four hundred hours test in a Fade-Ometer and in excess of months of exposure to water and sunlight without any visible changes.

Although the examples and illustrations described above relate to a specific copper-zinc alloy, it is to be understood that other copper base alloys such as copper-tin, copper-zinc-aluminum, and copper-zinc-tin are advantageously treated in accordance with this invention.

Despite the high degree of protection offered by the oxidation and water-resistant coating of this invention, there are instances of extremely severe conditions of use under which improved performance is desired. For example, when the flake is a copper alloy employed as a pigment in a vinyl resin system, conditions such as high pigment content, elevated temperature, the presence of fatty acids, or the use of the pigmented vinyl as a thin film, all accelerate degradation of the vinyl resin and attack on the pigment. Although a wide variety of vinyl stabilizers has been developed, the stabilizers are frequently found insufficient to prevent attack of the pigment under such severe conditions.

It has been found in accordance with this invention, however, that additional protection results if the vinyl stabilizer is incorporated into the flake product of this invention. The means by which the stabilizer protects the metal is not known, i.e., it is not known whether the stabilizer penetrates the coating and flakes onto the surface of the metal, is sorbed on the surface of the coating, or becomes incorporated into the coated flake in some other manner. Regardless of the mode of action, however, it has been found desirable to incorporate vinyl stabilizers in the coated flake of this invention.

The particular vinyl stabilizer which is employed is not critical to this invention, and any of those already known to the art may be employed, giving due consideration to the specific end use of the pigmented vinyl composition. Illustrative examples include lead salts or soaps, such as basic lead carbonate, tribasic lead sulfate, lead silicate, lead stearate and dibasic lead phthalate, lithium soaps, e.g. lithium stearate, silicon soaps, zinc soaps, barium soaps, cadmium soaps, organotin compounds such as di-n-alkyltin mercaptides, dibutyl tin dilaurate, and dibutyl tin maleate, epoxy resins, especially epoxidized oils such as epoxidized soybean oil and epichlorohydrin adducts of bisphenols such as bisphenol A, organic phosphites, such as triphenyl phosphite, diphenyl decyl phosphite, didecyl phenyl phosphite and tridecyl phosphite. Certain mixtures of metal salts or soaps are preferred, especially barium-cadmium soaps, barium-cadmium-zinc soaps, and barium-zinc soaps.

The amount of vinyl stabilizer is not critical to this invention, provided of course it is present in at least an amount sufficient to reduce attack on the pigment of the present invention. The actual amount will vary depending upon the particular stabilizer, metal and conditions of use of the product. In general, however, this protective amount is at least about one weight percent, based upon the weight of the metal, with increased protection being obtained with increasing amount. Ultimately an optimum value is reached, commonly below about 5 to about 10%, above which no concomitant increase in stability is observed. Use of amounts of stabilizer in excess of this value ordinarily is uneconomical and, in some instances, may adversely affect the coated flake product, as by reducing its free flowing character.

As a special case of the foregoing, it has been found particularly desirable to incorporate chelating agents into the flake product. A particularly useful chelating agent is benzotriazole, which, when present in amounts varying from about 1 to about 4 weight percent, based upon the metal, greatly improves the resistance of copper flakes to "greening" under severe conditions.

The stabilizer can be incorporated in the coated flake by any convenient technique, as by stirring a mixture of a solution of the stabilizer with the coated flake while evaporating off the solvent, Obviously, in such a process, the solvent must be less volatile than the stabilizer. In addition, it should wet the surface of the coated flake, and thus should be polar. Suitable solvents include ketones such as acetone, methyl ethyl ketone and the like.

The amount of solvent is not critical, provided there is sufficient to both dissolve the stabilizer, and wet the metal flakes.

The following example is illustrative of this aspect of the invention.

Example V

To 100 parts of a dried, coated brass flake produced in a manner similar to the process described in Example II, was added 3.75 parts of benzotriazole dissolved in 57 parts of methyl ethyl ketone, in a Baker-Perkins type high-shear mixture. The mixture was stirred at 250° F. and 20 inches (gauge) vacuum until the solvent had evaporated off.

To illustrate the superior stability of the resulting product, two samples of pigmented polyvinyl chloride were prepared, one containing the unmodified parent pigment and the other containing the benzotriazole-modified pigment of this example, employing the following formulation: 100 parts polyvinyl chloride (Geon 103EP), 40 parts butyloctylphthalate plasticizer, 1.0 part epoxidized soybean oil (Paraplex G-61), 2.0 parts barium-cadmium-zinc liquid stabilizer (Clarechem CLB 101), and 2.0 parts pigment. Each blend was milled on a 2-roll mill, sheeted out to 6-mil thickness, exposed to a water drop until dry (several hours), sandwiched with a white film produced from a similar formulation, except that it also contained 8 percent lauric acid, and exposed in an oven at 180° F. and 1½ p.s.i. compression until greening was noted. The sample containing the pigment having no benzotriazole greened badly at 96 hours, whereas the sample containing the pigment of this example evidenced only slight greening at 168 hours when the test was terminated.

In addition to the polyvinyl chloride discussed above, the coated metal flakes of this invention find use in other plastics such as polyethylene, polypropylene, nylon, cellulose acetate, cellulose acetate butyrate, melamine formaldehyde resins, polyesters, polyurethane, acrylonitrile-butadiene-styrene resins, polystyrene, polycarbonates, chlorinated polyethers, and other transparent or translucent plastic materials.

In the coating steps of the present invention it is preferable to use solvents which may be easily recovered and reused. Thus, for example, the hydrocarbon liquid used to form the emulsion in the first step of the process may be condensed and used again in subsequent coating operations. Likewise, the solvent employed as a vehicle for the carboxylic acid salt of the second step described above and the solvent for the stabilizer or chelating agent should also be recoverable by conventional methods.

What has been described are several methods of protecting metal particles and flakes by forming a coating thereon in situ. The first part of the various methods involves treating the metal flakes or particles with a metal acid salt such as the zinc acid phosphate of Example I. Since the metal acid phosphate coating thus produced contains hydrogen ions, the coating is not water-impervious. Accordingly, a second substituent must be added either in the first step such as by way of addition of the aluminum hydrate-sulfate, or by way of a second step such as treatment with a metal oxide, or, alternatively, treatment with a solution of a metal oxide, or, alternatively, treatment with a solution of a metal carboxylic acid salt. In this manner, the hydrogen ions are substantially replaced by metal ions with consequent improvement of water-resistant properties. Since the final coating in accordance with the invention is an inorganic complex of different ions, the coating is resistant to attack by most corrosive substances encountered in the plastic formulation field, and this resistance may be substantially increased, where necessary, by inclusion of a vinyl stabilizer or chelating agent in such coating.

The term "polyvalent" as used herein is intended to denote a valence greater than one.

It is to be appreciated that the examples set forth above are intended merely as illustrative of the present invention and that variations may be made therein by one skilled in the art without departing from the spirit and scope of this invention.

What is claimed is:

1. A particulate metal product comprising metal particles, each particle having as an oxidation resistant coating a deposit of a polyvalent metal acid phosphate salt, the metal ion of said salt being one which forms a water-soluble acid phosphate and a water-insoluble phosphate glass.

2. A product according to claim 1 wherein said metal particles are metal flakes.

3. A product according to claim 2 wherein said metal ion is at least one member of the group consisting of aluminum, calcium, cobalt, chromium, lead and zinc.

4. A particulate metal product obtained by mixing the product of claim 1 with a polyvalent metal compound which replaces hydrogen ions of the acid phosphate coating to produce a water-insoluble phosphate glass coating and heating the resulting mixture to form said phosphate glass coating.

5. A product according to claim 4 wherein the metal particles are metal flakes.

6. A product according to claim 5 wherein the metal ions in said phosphate glass coating are selected from the group consisting of aluminum, calcium, cobalt, chromium, lead and zinc.

References Cited
UNITED STATES PATENTS

| | | | |
|---|---|---|---|
| 1,789,477 | 1/1931 | Roseby | 148—6.15 Z |
| 2,038,251 | 4/1936 | Vogt | 117—100 MX |
| 2,232,352 | 2/1941 | Verweij et al. | 148—6.15 Z |
| 2,337,856 | 12/1943 | Rice et al. | 148—6.15 R |
| 2,528,787 | 11/1950 | Roland | 148—6.15 RX |
| 2,601,212 | 6/1952 | Polydoroff | 148—6.15 Z |
| 3,432,428 | 3/1969 | Wirth et al. | 252—387 X |
| 2,385,800 | 10/1945 | Doutz et al. | 148—6.15 |
| 2,470,136 | 5/1949 | Bramberry | 148—6.15 |
| 2,656,322 | 10/1953 | Eberle | 148—6.15 X |
| 2,810,759 | 10/1957 | Cottlo et al. | 148—6.15 X |
| 2,850,418 | 9/1958 | Otto et al. | 148—6.15 |
| 3,146,133 | 8/1964 | Lantoin | 148—6.15 |

RALPH S. KENDALL, Primary Examiner

U.S. Cl. X.R.

117—100 M; 148—6.15 R, 6.15 Z